United States Patent Office 3,048,626
Patented Aug. 7, 1962

3,048,626
N-(2,4,6-TRIIODOPHENYL)ACETURIC ACID AND SODIUM SALT
Vernon H. Wallingford, Ferguson, Mo., assignor to Mallinckrodt Chemical Works, St. Louis, Mo., a corporation of Missouri
No Drawing. Filed Dec. 5, 1960, Ser. No. 73,500
2 Claims. (Cl. 260—518)

This invention relates to halogenated compounds and more particularly to certain novel iodinated N-phenylacylamino acids.

Briefly the present invention is directed to certain N-(2,4,6-triiodophenyl)alkanamidoalkanoic acids, and to certain salts thereof. The invention also includes methods of preparing the novel compounds of the class described.

Among the objects of the invention may be mentioned the provision of new halogenated compounds; the provision of new iodinated N-phenylacylamino acids; the provision of new N-(2,4,6-triiodophenyl)alkanamidoalkanoic acids; the provision of compounds of the type indicated which are useful as roentgenographic contrast agents; and the provision of methods of preparing the novel compounds of the class mentioned. Other objects and features will be in part apparent and in part pointed out hereinafter.

The invention accordingly comprises the products and methods hereinafter described, the scope of the invention being indicated in the following claims.

The present invention is directed to the novel compounds represented by the formula:

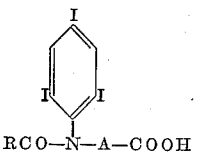

RCO—N—A—COOH where R is H or a lower alkyl radical and A is a lower alkylene radical.

The novel compounds of the present invention are useful as roentgenographic contrast agents, especially in oral cholecystography.

The compounds of the present invention can be prepared from the 2,4,6-triiodoanilides by the series of steps illustrated in the following equations:

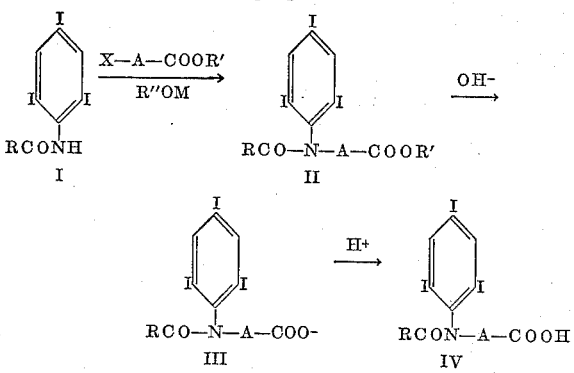

In the above equations R and A have the meanings previously assigned, X represents a halogen attached to a primary carbon, R′ represents a lower alkyl group; and R″OM represents a metal alcoholate. The condensation of the anilide (I) with the haloalkanoic acid ester, X—A—COOR′, is carried out in the presence of a nonaqueous solvent in which the reactants are at least partially soluble. After the condensation is completed the resulting ester (II) is hydrolyzed in alkaline medium, and acidification yields the free N-(2,4,6-triiodophenyl)alkanamidoalkanoic acid (IV).

Among the anilides suitable for use as starting material in the preparation of the new compounds of the invention may be mentioned the following as illustrative:
2,4,6-triiodoformanilide
2,4,6-triiodoacetanilide
2,4,6-triiodopropionanilide
2,4,6-triiodo n- and isobutyranilides Illustrative of primary halo-lower alkanoic acid esters which may be condensed with suitable triiodoanilides are the following:
Ethyl bromoacetate
Methyl beta-chloropropionate
Ethyl beta-bromoisobutyrate Illustrative of metal alcoholates which may be used as condensing agents in the above reaction may be mentioned sodium methylate, sodium ethylate, potassium methylate, and potassium ethylate. While alkali metal alcoholates such as those named, are, for obvious reasons, preferred for the purpose, other metal alcoholates may be used if desired.

As a nonaqueous solvent for use as a reaction medium, anhydrous ethanol has been found suitable. Other anhydrous lower alcohols such as methanol and propanol are also useful, as well as other nonaqueous solvents for the reactants to be used, for example dimethylformamide and mixtures thereof with anhydrous ethanol.

The following examples illustrate the invention.

EXAMPLE 1

*N-(2,4,6-Triiodophenyl)Aceturic Acid (N-Carboxymethyl-2,4,6-Triiodoacetanilide)*

2,4,6-triiodacetanilide (51.2 g., 0.1 mole) [Long and Burger, JACS. 63, 1587 (1941)] was dissolved in a cooled solution of sodium ethylate, prepared by dissolving metallic sodium (2.3 g., 0.1 mole) in 75 ml. of anhydrous denatured alcohol (Treasury Department Formula SDA 2B). Ethyl bromoacetate (17.5 g., 0.105 mole) was added all at once to the solution. The temperature immediately rose, and was controlled to about 35° C. during 15 minutes stirring. The slightly alkaline mixture was then heated to reflux temperature and stirred for another 15 minutes. To the warm neutral mixture was added a solution of potassium hydroxide (12 g. in 120 ml. of anhydrous denatured alcohol). The mixture was maintained at 60–66° C. for 20 minutes. A gummy solid separated, making it impossible to operate the mechanical stirrer. The mixture was slightly acidified with acetic acid (4.5 ml.) and the alcoholic liquor was poured off and evaporated to dryness on the steam bath. The resulting residue was combined with the main portion of the product. The combined fractions were dissolved in 500 ml. of water and a small amount of insoluble material was filtered off. The filtrate was made alkaline with ammonium hydroxide, filtered, and acidified first with acetic acid and then with an excess of hydrochloric acid to cause precipitation. The product began to separate as an oil which later crystallized on heating. It was filtered off, washed with water and dried at 90° C. Yield, 43.3 g. of a gray solid. The crude product was dissolved in hot alcohol (250 ml.), treated with decolorizing charcoal and precipitated by the addition of hot water (500 ml.). The purified product was filtered off, washed with water and dried at 90° C. Yield of colorless N-(2,4,6-triiodophenyl)aceturic acid, 38.6 g. M.P., 183.4–185.1° C. (corrected; clear colorless melt). Calculated for $C_{10}H_8I_3NO_3$: Neutral equivalent, 571; I, 66.75%. Found: N.E., 569; I, 66.83%.

When administered orally to a dog at a dosage level of 100 mg./kg., N-(2,4,6-triiodophenyl)aceturic acid produced X-ray shadows of the gall bladder 8 to 18 hours after administration that compared favorably with shadows produced by bunamiodyl sodium (marketed under the trade designation "Orabilex") at the same dosage level.

EXAMPLE 2

N-(2,4,6-Triiodophenyl)Aceturic Acid, Sodium Salt

The sodium salt of N-(2,4,6-triiodophenyl)aceturic acid was prepared from the free acid by conventional means.

The acute intravenous $LD_{50}$ of the salt in mice was found to be 269 mg./kg.

A 2% solution of the salt was administered orally to cats at a dosage level of 100 mg./kg. of body weight. During the period 8 to 18 hours following administration X-ray shadows of the gall bladder were produced which compared favorably with those produced in the same animals by bunamiodyl sodium administrated orally at the same dosage level.

In view of the above it will be seen that the several objects of the invention are achieved and other advantageous results obtained.

As various changes could be made in the above products and processes without departing from the scope of the invention, it is intended that all matter contained in the above description shall be interpreted as illustrative and not in a limiting sense.

I claim:
1. N-(2,4,6-triiodophenyl)aceturic acid.
2. N-(2,4,6-triiodophenyl)aceturic acid, sodium salt.

References Cited in the file of this patent

Baker et al.: J. Chem. Soc., 313 (1949).
Migrdichian: Organic Synthesis, vol. II (New York, 1957), page 1440.